United States Patent

[11] 3,620,585

[72] Inventors William J. Anderson;
Harold H. Coe, both of North Olmsted, Ohio
[21] Appl. No. 3,417
[22] Filed Jan. 16, 1970
[45] Patented Nov. 16, 1971
[73] Assignee The United States of America as represented by the Administrator of the National Aeronautics and Space Administration

[54] HIGH-SPEED ROLLING ELEMENT BEARING
3 Claims, 6 Drawing Figs.
[52] U.S. Cl. .................................................. 308/195
[51] Int. Cl. ............................................... F16c 33/32, F16c 33/38
[50] Field of Search ........................................... 308/188, 193, 194, 195, 212, 215

[56] References Cited
UNITED STATES PATENTS

| | | | |
|---|---|---|---|
| 1,193,019 | 8/1916 | Hughes...................... | 308/212 |
| 1,258,002 | 3/1918 | Hart........................... | 308/212 |
| 1,438,654 | 12/1922 | Leon........................... | 308/212 X |
| 1,766,440 | 6/1930 | Leon........................... | 308/194 |
| 2,742,332 | 4/1956 | Cobb........................... | 308/201 X |
| 3,527,513 | 9/1970 | Hewko........................ | 308/215 |

FOREIGN PATENTS

| | | | |
|---|---|---|---|
| 431,471 | 7/1926 | Germany..................... | 308/194 |
| 163,322 | 8/1922 | Great Britain................ | 308/195 |
| 181,316 | 12/1922 | Great Britain................ | 308/215 |
| 181,156 | 6/1922 | Great Britain................ | 308/215 |

*Primary Examiner*—Martin P. Schwadron
*Assistant Examiner*—Irwin C. Cohen
*Attorneys*—N. T. Musial, G. E. Shook and G. T. McCoy ABSTRACT: Holes through rolling elements in a bearing reduce the mass. A cage-mounted pin and rotatable tube thereon through each hole maintains the rolling element in the optimum position.

PATENTED NOV 16 1971　3,620,585

INVENTORS
WILLIAM J. ANDERSON
HAROLD H. COE

BY

ATTORNEYS

INVENTORS
WILLIAM J. ANDERSON
HAROLD H. COE

BY

ATTORNEYS

HIGH-SPEED ROLLING ELEMENT BEARING

ORIGIN OF THE INVENTION

The invention described herein was made by employees of the U.S. Government and may be manufactured and used by or for the Government for governmental purposes without the payment of any royalties thereon or therefor.

BACKGROUND OF THE INVENTION

This invention is directed to an improved rolling element bearing. The invention is particularly concerned with reducing the mass of the rolling elements so that the bearing will operate reliably with long life expectancy.

Load capacity and fatigue life for rolling element bearings must be increased in advanced aircraft and missile applications where high reliability is required. The mode of failure for the rolling elements is from pitting fatigue or spalling characterized by material removal from the contact surfaces causing a pit limited in depth and area. The cause of this failure is a fatigue phenomenon, and the failure results from shearing stresses below the rolling contact surfaces which are a function of the contact load.

A problem of special interest in ball bearing applications is where the centrifugal force of each ball is significant and thus increases the contact load. The balls orbit rapidly within the bearing when it is operating at DN values above 1.5 million. The DN value is the product of the bearing bore diameter in mm times the shaft speed in r.p.m. A high centrifugal force is developed which results in an appreciable increase in the hertz compressive stress at the outer-race ball contact. Ball centrifugal force is an important factor in ball bearings operating at high speeds with a nominal thrust load. This centrifugal force can seriously limit the operating range of a bearing because of both high stresses and high heat generation. These limitations are especially significant in large-bore ball bearings containing large diameter balls. The effect on heat generation at high speeds of various bearing geometric design factors, such as ball diameter, number of balls, pitch diameter, contact angle and race curvature, can be determined by analysis.

One proposed solution to problems of ball bearing centrifugal force is to use smaller diameter balls, since reducing the physical size of the ball reduces the bearing centrifugal force. However, ball size can be reduced only a limited amount before the annular space available for the cage becomes too small. If the cage cross section is reduced excessively, the cage may break at high speeds because of inadequate strength.

Another suggested solution for reducing ball centrifugal force is to use hollow balls. By reducing ball weight the centrifugal force is reduced without decreasing the ball size. Neither the internal bearing design geometry nor the cage design is affected. It is necessary to have extremely thin walls in the hollow balls to achieve sufficient weight reduction for decreasing centrifugal forces. However, flexural fatigue occurs with these extremely thin walls, and the life of the bearing is reduced to a fraction of its theoretical life. Also, the interior wall of the hollow ball is geometrically imperfect due to existing manufacturing techniques which causes an imbalance in ball kinetics and localized stress raisers within the inner wall for thin section balls.

SUMMARY OF THE INVENTION

These problems have been solved in bearings constructed in accordance with the present invention. The bearings have a plurality of rolling elements interposed between inner and outer races. A cage or retainer separates and positions the rolling elements. The mass of each rolling element is reduced to increase bearing life and decrease heat generation without significantly changing any of the bearing kinematical characteristics. The mass reduction is achieved by drilling a passage or electric discharge machining a hole having a diameter sufficient to reduce the mass by the desired amount. A pin is inserted through the cage walls and the hole in the rolling element. The pin limits the free pivoting of the maximum moment of inertia axis of each rolling element.

OBJECTS OF THE INVENTION

It is, therefore, an object of the present invention to provide an improved rolling-element bearing for high-speed applications.

Another object of the invention is to provide a bearing having improved fatigue life and load capacity.

These and other objects of the invention will be apparent from the specification which follows and from the drawings wherein like numerals are used throughout to identify like parts.

DESCRIPTION OF THE PREFERRED EMBODIMENT

Figure 1:
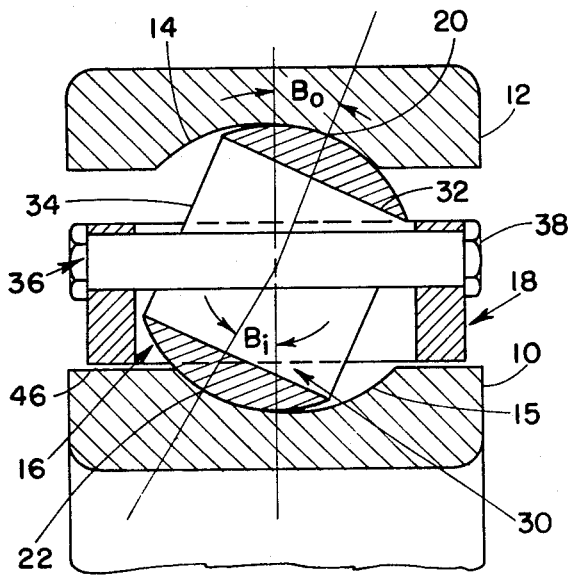
FIG. 1 is a vertical section of a rolling element bearing made in accordance with the present invention.

In the manufacture of rolling-element bearings, blanks of hardenable high-carbon chromium steel, such as SAE 52100, are fabricated into ring-shaped blanks. These blanks are heat treated to a Rockwell C hardness of 58 or greater. This is the acceptable hardness for bearings because brinelling of such hardened materials will generally take place under normal operating loads at lower hardness levels.

Referring now to the drawings the ring blanks are ground to specific dimensions to form an inner ring 10 and an outer ring 12 having honed race grooves 14 and 15. A plurality of rolling elements 16 are located between the inner ring 10 and the outer race 12. The rolling elements 16 are positioned and retained by a separator or cage 18.

Referring now to FIG. 1 the rolling elements 16 are balls which form angular contact bearings to accommodate radial and thrust loads. The bearing may be a deep-grooved ball bearing which is designed primarily to take radial loads. For the angular-contact ball bearing, the ball in contact with the races forms contact angle $B_i$ at the inner race and $B_o$ at the outer race. When the bearing is under static conditions $B_i$ generally equals $B_o$. However, when the bearing is started, $B_i$ increases and $B_o$ decreases approaching a zero contact angle.

In the thrust bearing shown in FIG. 1 the ball 16 will spin and roll on an outer race contact 20 and an inner race contact 22. As the speed increases, the load at the outer ring 12 increases, and the amount of spinning at the inner race contact 22 also increases. This results in extremely high heat generation which causes the rolling element 16 to expand. The diameter of the inner ring 10 also expands which results in a decrease in clearances between the inner race 10, the rolling element 16, and the outer race 12. This phenomenon can result in seizure of the bearing.

Figure 6:
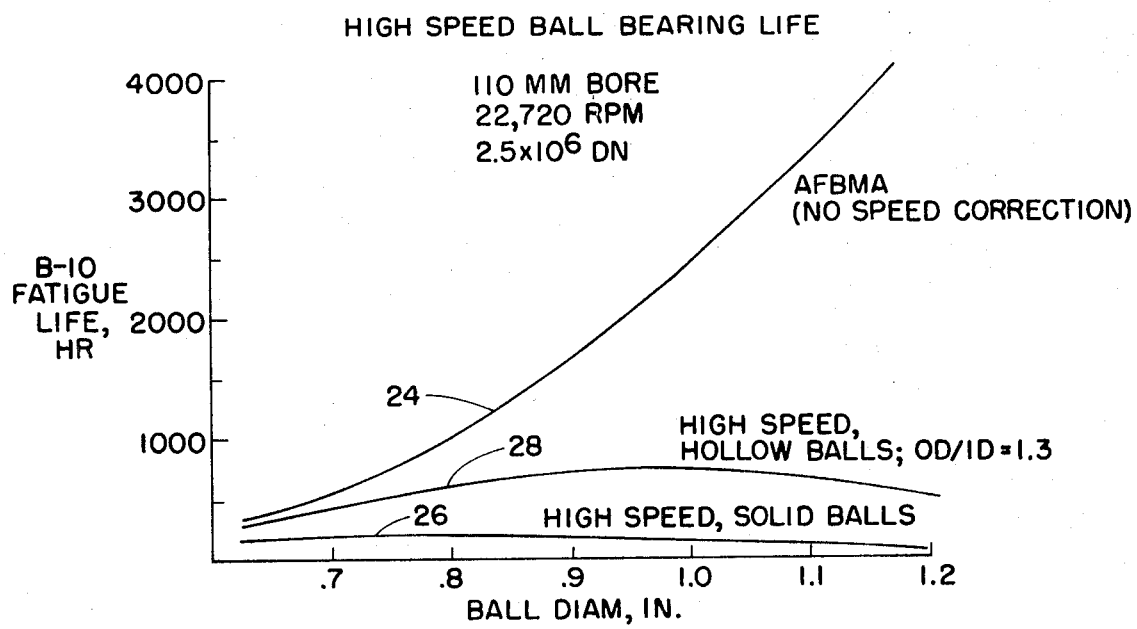
FIG. 6 is a graph showing the relationship between weight reduction and life for various ball diameters.

In addition, the load on the outer race becomes such that the fatigue life which is proportional to the load to the third power decreases significantly. This is illustrated in the graph of FIG. 6. This figure shows a theoretical case of a 110 millimeter bore angular-contact ball bearing run at a speed of 22,720 r.p.m. which produces a DN value of 2.5 million. By retrofitting the bearing with various size balls to decrease the weight of the rolling element, a theoretical life shown by a curve 24 is obtained. However, if centrifugal force is considered, a life curve 26 is obtained. If the weight of the rolling element is reduced by 55 percent, a life curve 28 is obtained. An increase of life of 3 to 1 over that of the solid balls results.

In order to obtain a sufficient reduction in weight, such as the 55 percent shown in FIG. 6, hollow balls and roller have been proposed. However, where the desired weight reduction has been obtained, flexure of the rolling elements becomes a severe problem and reduces the life expectancy to a fraction of its calculated value. In order to obtain the required life and to avoid the problem of flexure failure, a sufficient wall cross section must be achieved at the point of contact 22. This may be achieved by providing a hole or passage 30 that is machined through each ball 16. This hole 30 has a cylindrical wall 32 within the ball.

Formation of the hole 30 removes a volume within the ball defined by the volume of the hole plus the volume of portions 34 removed at both ends. In this way the maximum cross sections are maintained at the points of contact 20 and 22. The hole 30 may be torroidal in shape instead of cylindrical. In addition to maintaining the maximum cross section at the points of contact, the rolling element is not prone to becoming unbalanced if the final wall thickness is not perfectly uniform as with hollow balls.

The ball 16 must be maintained in the proper position prior to bearing operation or rotation so that the end portions 34 do not come into contact with either the inner ring 10 or the outer ring 12. This is accomplished by a pin 36 that is inserted through the cage 18 and hole 30. The pin 36 restricts the free pivoting of the maximum moment of inertia axis of each ball 16 to a predetermined angle. Each pin 36 is preferably held rigidly in place by bolts 38 or rivets. Where there is an interference fit between the pin 36 and the cage 18, bolts or rivets need not be used.

The pin 36 is sized so that it does not prevent free pivoting of the hole axis as the ball rolls through different positions in the bearing. The extent of this pivoting will depend on bearing geometry and operating conditions.

The end portions 34 are maintained open at all times to enable lubricant to flow through the hole 30. In this manner the lubricant acts as a coolant at high speeds and maintains the bearing differential tolerances. This prevents seizure of the bearing.

DESCRIPTION OF ALTERNATE EMBODIMENTS

Figure 3:
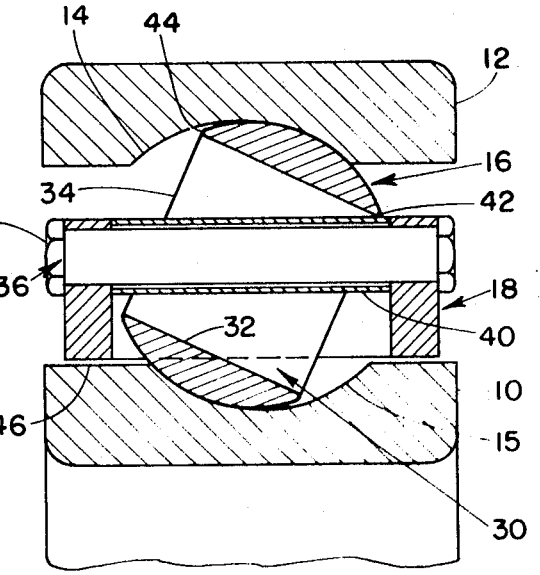
FIGS. 3, 4 and 5 are vertical sections of modifications of rolling-element bearings made in accordance with the present invention.
Figure 2:
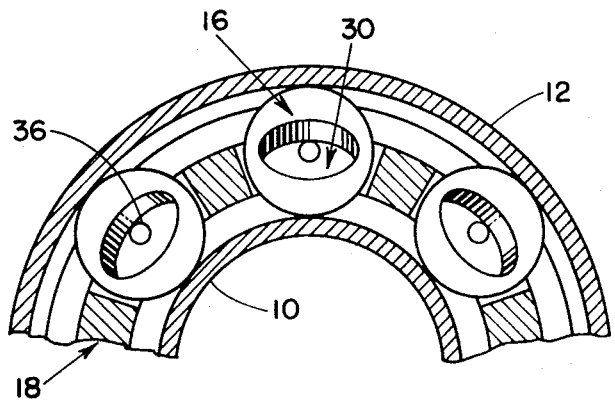
FIG. 2 is a partial sectional view of a ball bearing made in accordance with the present invention.

Referring now to FIG. 3 there is shown a cylindrical tube 40 supported by the pin 36. The tube 40 is free to rotate over the pin 36. In operation, when the end portion 34 contacts the tube 40 in a rotating motion, a rolling action as opposed to a sliding action occurs at the area of contact 42. This reduces both the end wear and pin wear.

In addition to reducing wear, the end portion 34 may have a rounded cross section 44. In this manner the contact stress at the end portions to tube contact is reduced.

Figure 4:
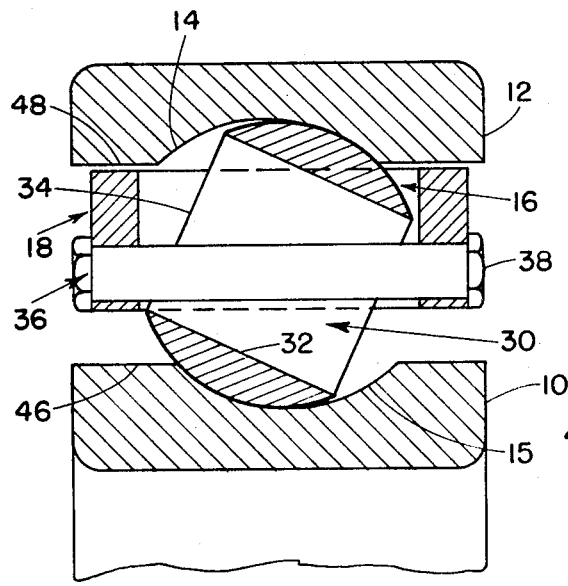
Figure 5:
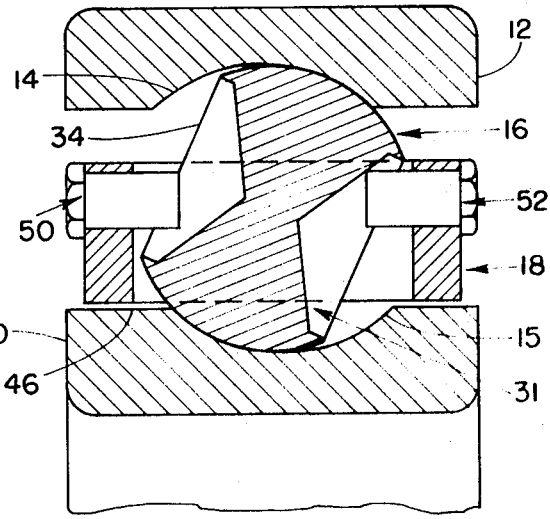

In FIGS. 1, 3 and 5 the cage 18 rides on lands 46 provided on the inner ring 10. In an alternate embodiment shown in FIG. 4 the cage 18 rides on lands 48 on the outer ring 12. In this manner, lubricant entering the bearing between the cage 18 and the inner ring 10 enters the hole 30 and is carried to the outer ring 12 by centrifugal force. This provides lubricant at the contact between the cage 18 and the land 46. In this manner, more efficient cooling of the bearing is obtained with adequate lubrication of this contact.

In the embodiment shown in FIG. 5 the ball 16 has a pair of opposed recesses or depressions 31 instead of a hole. These depressions do not extend entirely through the ball 16. Also a pair of opposed stub pins 50 and 52 extend through the cage 18 and protrude into the depressions 31. This restricts free pivoting of the maximum moment of inertia axis of each ball 16 to prevent the end portions 34 from coming into contact with the race grooves 14 and 15.

What is claimed is:

1. A high-speed thrust bearing comprising
   an inner race,
   an outer race,
   a plurality of balls having reduced mass, each of said balls having a substantially solid portion at the peripheral surface and a passage extending along a center line completely through said ball to reduce the mass whereby the maximum moment of inertia is about said center line,
   a circular cage interposed between said inner and outer races for mounting said balls in spaced relationship for rotation as the inner race revolves relative to the outer race and said races contact said solid portions and said cage engaging one of said inner and outer races,
   a plurality of tubular members spaced from the walls of said passages, said tubular members being mounted for free rotation on pins rigidly secured to said cage and extending completely through said passages, said tubular members limiting the pivotal movement of said balls to maintain said solid portions in contact with said races by contacting said passages when said balls are at the end limits of said pivotal movement.

2. A bearing as claimed in claim 1 wherein the cage engages the inner race.

3. A bearing as claimed in claim 1 wherein the cage engages the outer race.

* * * * *